(No Model.)

T. D. GALLOWAY.
SOWING MACHINE.

No. 321,099. Patented June 30, 1885.

Witnesses:
E. J. Walker

Inventor:
Thomas D. Galloway
by his attorney

United States Patent Office.

THOMAS D. GALLOWAY, OF OSHAWA, ONTARIO, CANADA.

SOWING-MACHINE.

SPECIFICATION forming part of Letters Patent No. 321,099, dated June 30, 1885.

Application filed February 12, 1885. (No model.) Patented in Canada February 26, 1885, No. 21,167.

*To all whom it may concern:*

Be it known that I, THOMAS DOBBIE GALLOWAY, a citizen of the Dominion of Canada, residing at Oshawa, in the province of Ontario, have invented certain new and useful Improvements in Sowing-Machines; and I do hereby declare the following to be a full, clear, and exact description of the invention, such as will enable others skilled in the art to which it appertains to make and use the same.

This invention relates, more especially at least, to that class of grain-drills in which the drill-teeth consist of a receiving-funnel and a detachable tubular drill-point, so that on removing the drill-points of such a machine and applying or bringing into position suitable scattering means it may be used as a broadcast seeder. Heretofore I constructed the funnels of the drill-teeth in such a manner that the drill-points could be replaced by the hoes associated with the machine when used for broadcast sowing. I have ascertained that oftentimes, if not always, it is advantageous to use hoes in conjunction with the drill-points, so as to distribute the seed somewhat by such hoes after the drill-points have deposited it in the furrows. One object of my invention is to effect this result; and to this end my improvement consists, as a whole, of the combination of a drill-tooth and a hoe attached thereto, so as to run in the rear of the same.

In order that my invention may be clearly understood, I have illustrated in the annexed drawings, and will proceed to describe, a practical form thereof wherein the receiving-funnel consists of two halves between which the drill-point and hoe, or either of them, can be secured.

Figure 1:
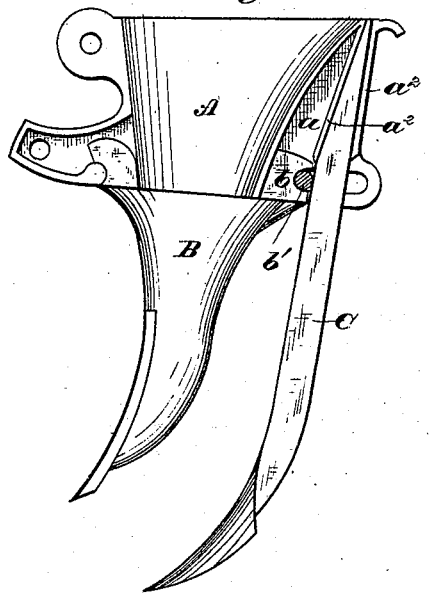
Figure 2:
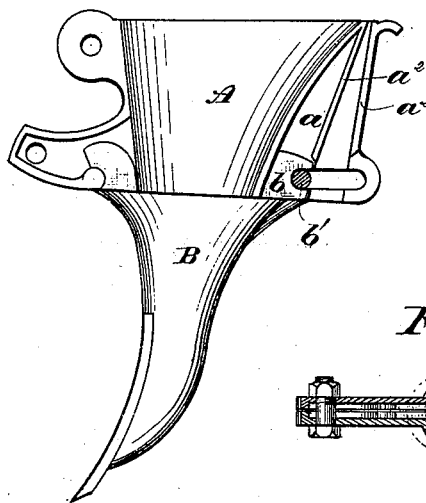
Figure 3:
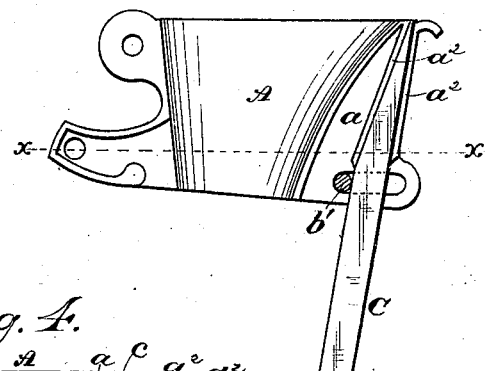
Figure 4:
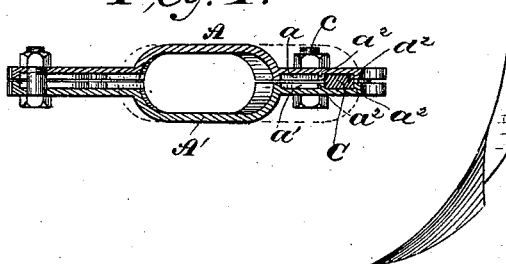

Figure 1 represents a side elevation of my combined drill-tooth and hoe, one-half of the funnel being omitted. Fig. 2 represents a similar view, the hoe being omitted. Fig. 3 represents such a view, omitting the drill-point. Fig. 4 represents a horizontal section taken in the plane indicated by the broken line X X of Fig. 3, showing, however, both halves of the receiving-funnel.

The same letters of reference indicate identical parts in all the figures.

The forward ends of the two halves A A' of the receiving-funnel do not differ in construction from that of my previous drill-teeth for this class of seeding-machines, and the tubular drill-point B is also constructed and applied substantially as heretofore, all as described in my application for a United States Patent filed December 22, 1884, Serial No. 151,005.

In order to make provision for the application of the hoe C, I construct the funnel-halves with rearwardly-projecting flanges or cheek-plates $a\ a'$, having each a pair of fins or low ribs, $a^2$, whereby a sort of socket is formed between the cheek-plates for the insertion and retention of the upper end of the hoe-stock. These sockets are in rear of the rear lug, $b$, of the drill-point, so that the hoe-stock does not interfere with the attachment or detachment of such drill-point. The rear lug, $b$, of the drill-point—preferably provided with a notch, $b'$, in its rear edge to lock it on the clamping-bolt $c$—and that portion of the hoe-stock which enters between the cheek-plates of the receiving funnel are made of substantially the same thickness, in order that both may be clamped between said cheek-plates. The upper end of the hoe-stock and its socket are shown as tapering, so that the hoe when applied cannot slide up on the funnel; but these parts may be made straight, so as to provide for vertical adjustment of the hoe. In all cases the hoe-blade is to run deeper than the drill-point.

I have described a convenient and effective method of attaching the hoe to the receiving-funnel of the drill-tooth, but do not primarily confine myself to this particular method, it being obvious that it may be attached in other ways. The hoe may be easily removed whenever it may be preferred to use the drill-tooth only in drilling.

The described combination with a drill-tooth of a hoe attached to it and running in its wake is useful, and I claim it, whether the drill-tooth is a single tube without a detachable drill-point, as in simple grain-drills, or has a detachable drill-point, as in the convertible machine alluded to. Although in the latter connection it possesses the incidental advantage over and above the convertible machines heretofore known, that attachment or detachment of the drill-points alone is required for converting the machine from either style into the other.

I claim as my invention—

1. The combination, substantially as before set forth, of a drill-tooth and a deeper running hoe attached thereto, so as to operate in the wake thereof.

2. The combination, substantially as before set forth, of the receiving-funnel of a drill-tooth, the detachable tubular drill-point, and the hoe attached to the funnel in rear of the drill-point.

3. The combination, substantially as before set forth, of the receiving-funnel and the hoe attached thereto in a position, substantially as described, so as to leave room for a tubular drill-point in advance of it.

4. A receiving-funnel constructed substantially as described, so that both a tubular drill-point and a hoe may be carried thereby at the same time.

In testimony whereof I affix my signature in presence of two witnesses.

THOMAS D. GALLOWAY.

Witnesses:
B. E. J. EILS,
E. T. WALKER.